United States Patent [19]

Nakayama

[11] Patent Number: 5,027,230
[45] Date of Patent: Jun. 25, 1991

[54] STILL IMAGE INFORMATION REPRODUCING APPARATUS INCLUDING SEARCHING FUNCTION

[75] Inventor: Jin Nakayama, Akishima, Japan

[73] Assignee: Casio Computer Co., Ltd., Tokyo, Japan

[21] Appl. No.: 314,406

[22] Filed: Feb. 22, 1989

[30] Foreign Application Priority Data

Feb. 29, 1988 [JP] Japan .................................. 63-46847

[51] Int. Cl.⁵ .............................................. H04N 5/76
[52] U.S. Cl. ...................................... 360/35.1; 360/32; 360/35.1; 360/72.2; 358/312; 358/313
[58] Field of Search ....................... 360/35.1, 32, 72.2; 358/312, 313

[56] References Cited

U.S. PATENT DOCUMENTS

4,802,019  1/1989  Harada et al. ................. 360/72.2 X
4,910,604  3/1990  Takei et al. .................... 360/35.1 X Primary Examiner—Roy N. Envall, Jr.
Assistant Examiner—Hung Tien Dang
Attorney, Agent, or Firm—Frishauf, Holtz, Goodman & Woodward

[57] ABSTRACT

A still-image information recording/reproducing apparatus records a plurality of still-image information on a recording medium, e.g., a floppy disk, and reproduces such still-image information which has been recorded on the floppy disk. In the normal mode, each of the still images is reproduced. In the index mode, all of the still images recorded on the floppy disk are reproduced as a single still image. In particular, the still-image information recording/reproducing apparatus reproduces each of the still images read from the floppy disk during the index mode, and synthesizes all of the reduced still images with each other, so that a single still image can be produced and output therefrom.

16 Claims, 5 Drawing Sheets

STILL IMAGE INFORMATION REPRODUCING APPARATUS INCLUDING SEARCHING FUNCTION

BACKGROUND OF THE INVENTION

1. Field of the Invention

The present invention generally relates to a still-image information reproducing apparatus for reproducing still-image information recorded on a magnetic disk, a semiconductor memory and the like. More specifically, the present invention is directed to a still image information reproducing apparatus capable of searching a desirable still image from a plurality of still images.

2. Description of the Related Art

Very recently, various types of still image recording apparatuses have been marketed, for instance, an electronic still camera for recording still image information on a recording medium such as a magnetic disk.

In an electronic still camera, for instance, the still images produced by employing a solid state imaging element such as a CCD (charge-coupled device) are recorded on a video floppy disk. On a single floppy disk, 50 sheets of still images can be recorded in the field recording mode.

Then, the still images recorded on the floppy disk of the above described still-image recording apparatus can be reproduced on a television monitor by employing a still-image reproducing apparatus.

In such a conventional still-image reproducing apparatus, the still-image reproducing process is however performed every 1 track so that it is very inconvenient to search for a desired still-image data for reproduction purposes.

SUMMARY OF THE INVENTION

The present has been made in an attempt to solve the drawbacks of the conventional still-image information reproducing apparatus, and therefore has an object to provide a still image information reproducing apparatus capable of readily searching a desired still image, while reproducing a plurality of still images which have been recorded on a still image information recording medium, e.g., a floppy disk or the like.

To achieve the above described object of the present invention, a still image information reproducing apparatus, according to the invention, reproduces desired still-image information from a plurality of still image information previously recorded on a recording medium. More specifically this still-image information reproducing apparatus comprises an output unit for outputting a plurality of the still-image information from the recording medium;

a reducing unit for reducing the still-image information obtained by the output unit and for producing reduced still-image information;

a uniting section for uniting a plurality of the reduced still-image information obtained by the reducing unit and for producing united still-image information constructed of a plurality of the reduced still-image information; and, a video signal output unit for outputting a video signal according to the united still-image information produced from the uniting section.

According to the still-image information reproducing apparatus with the above-described circuit arrangements, since a plurality of still images which have been recorded on the still-image recording medium are confirmed within one checking time, a very simple selection can be made in searching for a desired still picture from the recorded still pictures.

BRIEF DESCRIPTION OF THE DRAWINGS

The invention will now be described further by way of example only and with reference to the accompanying drawings, in which.

DETAILED DESCRIPTION OF THE PREFERRED EMBODIMENT

Arrangement of Still-Image Information Recording/Reproducing Apparatus

Figure 1:
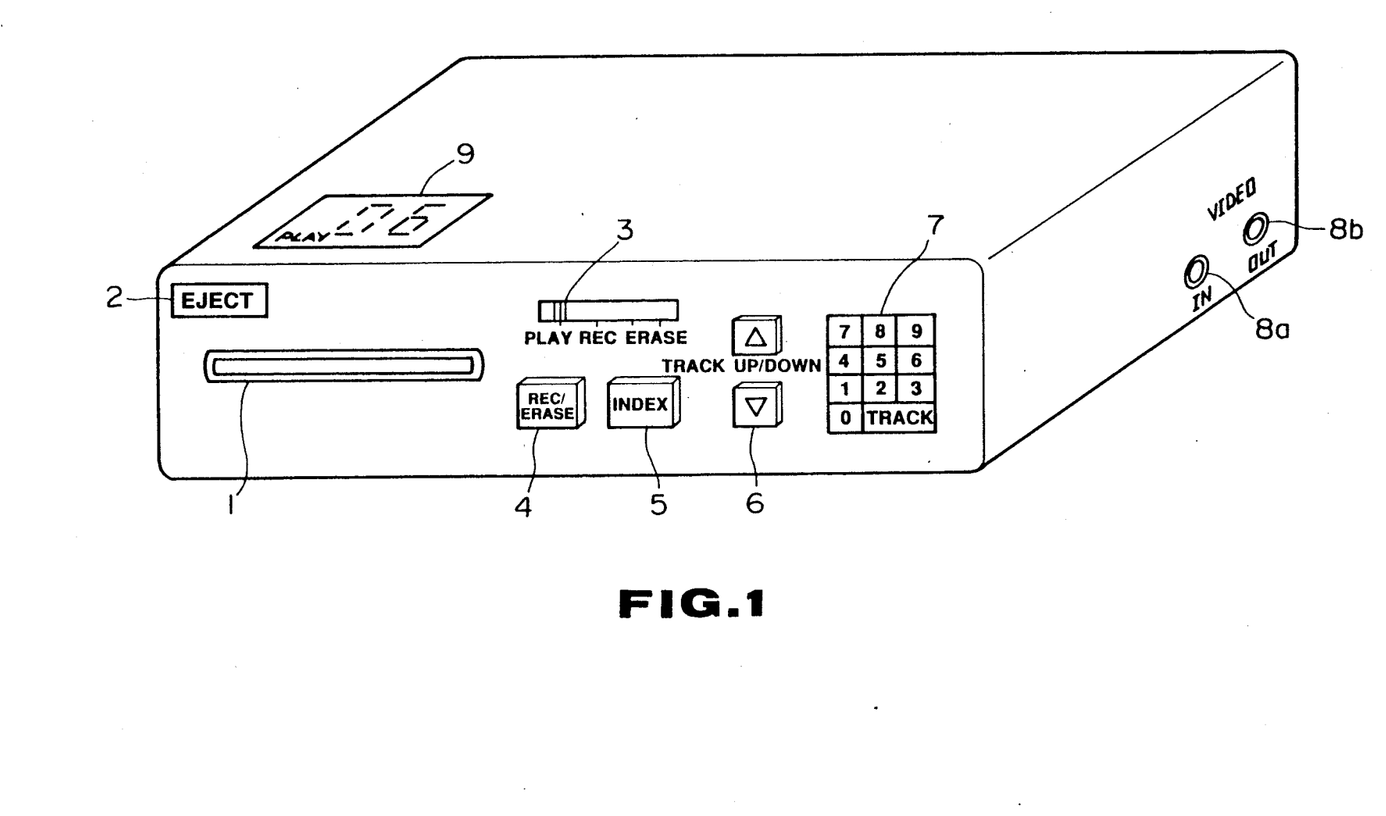
FIG. 1 is a perspective view of a still-image recording/reproducing apparatus according to a preferred embodiment of the invention.

FIG. 1 is a perspective view of a still-image information recording/reproducing apparatus according a preferred embodiment of the invention. On a front panel of this still-image recording/reproducing apparatus shown in FIG. 1, there are provided, from the left end, a disk insertion unit 1, a disk eject key (indicated as "EJECT"), 2, a mode key 3, a recording/erasing key (represented as "REC/ERASE) 4, an index key (denoted as "INDEX") 5, a track selection key 6, and a track designation key 7. Also, an input terminal (represented as "IN") 8a and an output terminal (indicated as "OUT") 8b of an image signal (indicated as "VIDEO") are provided on a right side of the still-image information recording/reproducing apparatus. A track display unit 9 is formed on an upper front surface of this recording/reproducing apparatus.

Then, in the still-image recording/reproducing apparatus shown in FIG. 1, to record still image data, which has been input from the input terminal 8a for the image signal, on the floppy disk inserted into the disk insertion unit 1, the mode key 3 is set to the above-described "REC" mode, and the recording/erasing key 4 is operated after the desired recording track of this floppy disk is designated by the track designation key 7 while monitoring the track display unit 9. Also, to erase the image recorded on the floppy disk, the mode key 3 is set to the "ERASE" mode, the recording/erasing key 4 is operated after the record track on which the image data to be erased has been recorded is designated by the track designation key 7. To reproduce the image data, which has been recorded on the floppy disk, and output via the output terminal 8b on a TV (television) monitor (not shown), the mode key 3 is set to the "PLAY" mode and also either the track selection key 6 or track designation key 7 is operated. As a result, the recorded tracks which are to be reproduced are successively updated and then the desired recorded track can be reproduced.

During this reproduction mode, when the index key 5 is operated, all of the image data recorded on 50 tracks of the floppy disk are reduced by 1/50 in a size and reproduced all together on one screen of the TV monitor.

Figure 2:
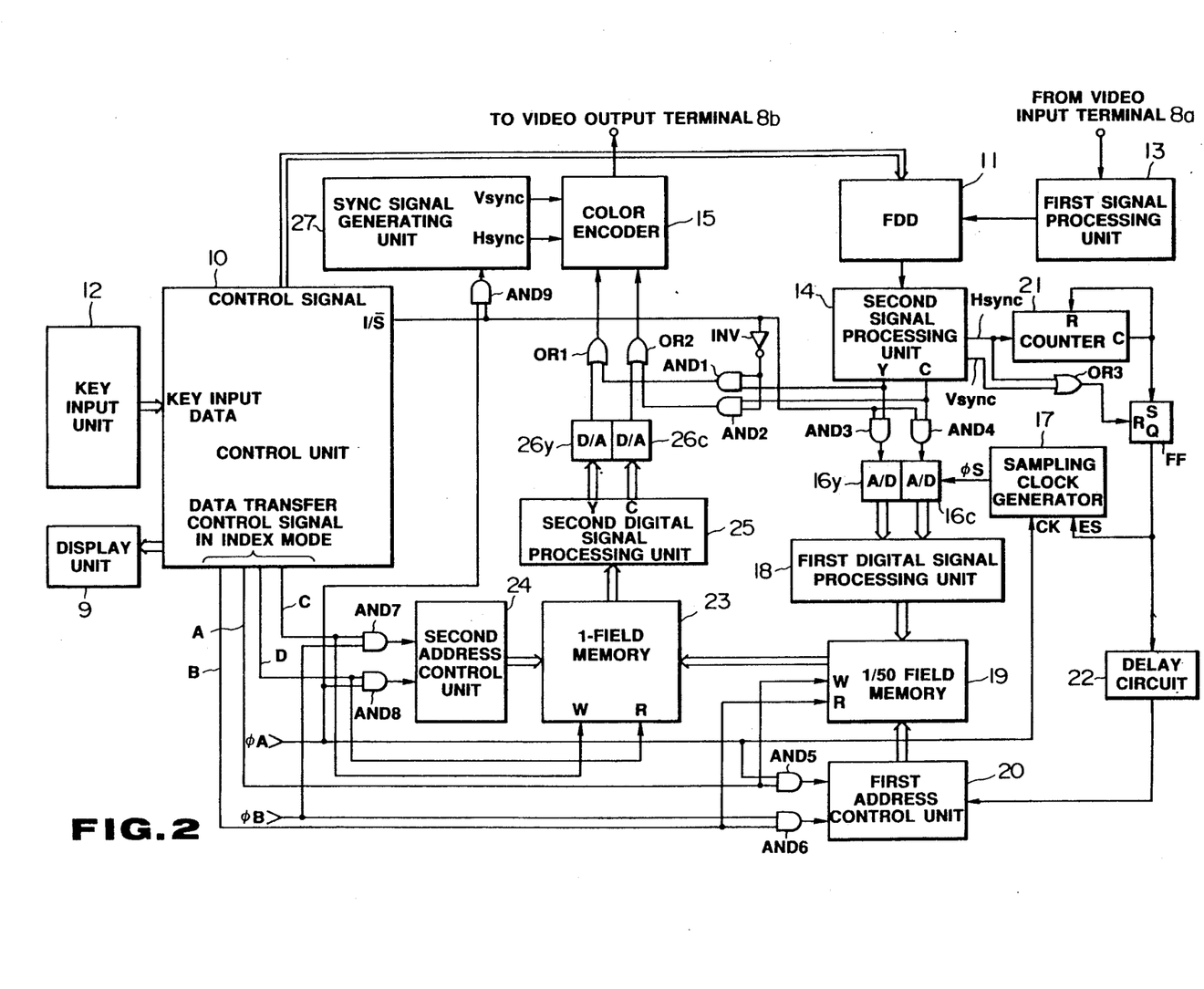
FIG. 2 is a schematic block diagram of a circuit arrangement of the still-image recording/reproducing apparatus shown in FIG. 1.

Circuit Arrangement of Still-Image Information Recording/Reproducing Apparatus In FIG. 2, there is shown a circuit arrangement of the above-described still-image information recording/reproducing apparatus.

A control unit 10 to which a magnetic disk apparatus (FDD) 11 is connected, is provided so as to control all operations of this circuit in response to various key operation signals supplied from a key input unit 12. The image (picture) signal input from the video input terminal IN 8a shown in FIG. 1, is applied to a first signal processing unit 13. The function of the first signal processing unit 13 is firstly to separate the input image signal into a luminance (video) signal Y, and color difference signals (R-Y) and (B-Y), secondly to FM modulate each of these separated signals, finally to synthesize the FM-modulated signals. The resultant image signal which has been FM-modulated and synthesized in the first signal processing unit 13, is output to the magnetic disk apparatus 11. It should be noted that the above-described color difference signals (R-Y) and (B-Y) are line sequenced while being synthesized with the luminance signal Y. In other words, the color difference signals (R-Y), (B-Y), (R-Y), --- (B-Y) are alternately aligned every 1 H (one horizontal scanning period) so as to be synthesized with the luminance signal Y. The memory areas of the floppy disk employed in the magnetic disk apparatus 11 can store the image data in 50 tracks. 1-field image data is recorded on one track of the floppy disk. This implies that a single floppy disk can store either 50 images in the field recording mode, or 25 images in the frame recording mode. The image data read out from the designated track of the floppy disk employed in the magnetic disk apparatus 11, is output to a second signal processing unit 14. Then, this second signal processing unit 14 separates the image signal supplied from the magnetic disk apparatus 11 into the luminance signal "Y" and color difference signals (R-Y) and (B-Y), and FM-demodulates each of these signals. Under the search mode "S" (i.e., normal reproduction mode) where the index key 5 of the key input unit 12 is not operated, both the demodulated luminance signal "Y" and color difference signals C (i.e., (R-Y) and (B-Y)) are output via AND gates "AND1", "AND2" and OR gates "OR1", "OR2" to a color encoder 15. In other words, an I/$\overline{S}$ signal derived from the control unit 10 has been supplied via an inverter INV to these AND gates AND1 and AND2. Since in the search mode "S", this I/$\overline{S}$ signal is set to a "0" level, both the FM-demodulated luminance signal "Y" and color difference signals "C" are output via the AND gates "AND1" and "AND2", and the OR gates "OR1" and "OR2" to the color encoder 15. The function of this color encoder 15 is to produce the NTSC (National Television System Committee) video signal from the luminance signal "Y" and color difference signals "C" of the input image signal. The resultant NTSC video signal produced by the color encoder 15 is output via the video output terminal OUT 8b shown in FIG. 1 to, for instance, a monitor television for reproduction purposes.

When, on the other hand, the index mode "I" is designated by operating the index key 5 shown FIG. 1, the signal level of the I/$\overline{S}$ signal derived from the control unit 10 becomes "1" and the 1-leveled I/S signal is supplied to the AND gates "AND3" and "AND4". As a consequence, both the luminance signal "Y" and color difference signals "C" which have been demodulated by the second signal processing unit 14, are output via AND gates "AND3" and "AND4" to A/D (analog-to-digital) converting units 16y and 16c. These A/D converting units 16y and 16c A/D-converts both the luminance signal "Y" and color difference signals "C" of the image signal supplied from the second signal processing unit 14, into corresponding 8-bit digital signals in synchronism with a sampling clock $\phi_s$ derived from a sampling clock generator 17 in response to a clock $\phi_A$. Then, the A/D converted 8-bit digital signals are alternately arranged in the order of the digital luminance signal and digital color difference signals in a first digital signal processing unit 18, and thereafter output into a 1/50 field memory 19.

It should be noted that the function of this 1/50 field memory 19 is to store such a 1/50-field (169 bytes × 49) image signal that has been reduced by 1/10 in the horizontal signal component and also 1/5 in the vertical signal component. The above-described signal reduction of the 10-field image signal is performed during the A/D conversion of the image signal.

Precisely speaking, the signal reduction with respect to the horizontal signal component of the image signal is performed in such a way that the frequency of the sampling clock $\phi_s$ supplied to the A/D converting units 16c and 16y is properly set, whereas the signal reduction with respect to the vertical signal component of the image signal is performed in such a manner that the number of the horizontal scanning lines for performing the A/D conversion is limited.

Accordingly, the frequency of the sampling clock $\phi_s$ generated from the sampling clock generator 17 is selected to be 1.35 MHz, because the sampling frequency becomes 13.5 MHz in case that the sample number of the image signal during, for instance, one horizontal scanning period when no signal reduction is executed.

On the other hand, to reduce the vertical signal component of the image signal by 1/5, the A/D conversion is carried out for the image signal during one horizontal scanning period with respect to 5 horizontal scanning operations.

The 1/50-field memory 19 is addressed by the first address control unit 20. The write address instruction clock for the first address control unit 20 is achieved by inputting a clock $\phi_A$ via the AND gate AND5, and the read address instruction clock for this control unit is achieved by inputting a clock $\phi_B$ via the AND gate AND6. These AND gates are under control by the data transfer control signals output from the control unit 10. That is, the above-described first address control unit 20 performs the write address control in response to the clock signal $\phi_A$ supplied via the AND gate AND5 thereto, which is controlled under the transfer control signal "A" that is output from the control unit 10 into the 1/50-field memory 19 as the write signal W, and, on other hand, performs the read address control in response to the clock signal $\phi_B$ supplied via the AND gate AND6 thereto, which is controlled under the transfer control signal "B" that is output from the control unit 10 into the 1/50-field memory 19 as the readout signal "R".

In, on the other hand, the second signal processing unit 14, the horizontal sync signal Hs contained in the luminance signal Y of the image signal is output into the counter 21. This counter 21 counts the horizontal sync signal Hs supplied thereto, and outputs a carry signal "C" at its count value "5". The carry signal "C" derived from the counter 21 is supplied to a reset terminal "R" of this counter 21 per se, and also a set terminal "S" of a flip-flop FF. To a reset terminal "R" of this flip-flop FF, both the horizontal sync signal Hs and vertical sync signal Vs of the image signal obtained in the second signal processing unit 14 are input via an OR gate OR3. In other words, this flip-flop FF is set every time the image signal constructed of 5 horizontal scanning lines with respect to the second signal processing unit 14 from the magnetic disk apparatus 11, during the time required for processing 1 horizontal scanning line. A Q-output from the flip-flop FF is output to the sampling clock generator 17 as an enable signal "Es", and also delayed via a delay circuit 22 in accordance with the flyback period of the above-described horizontal scanning operation. Then, this output is supplied as an address starting signal to the first address control unit 20.

In other words, as previously described, the image signal constructed of 1/5 horizontal scanning line, which is input from the first signal processing unit 14, is A/D-converted in the A/D converting units 16y and 16c, and the sampling number with respect to 1 horizontal scanning operation is reduced by 1/10 with regard to the normal sampling number (i.e., non-image reduction) for the A/D conversion. As a consequence, 1-screen image signal in the horizontal direction is reduced by 1/10, and also in the vertical direction is reduced by 1/50, so that wholly, this 1-screen image signal is reduced by 1/50, and thus can be written into the 1/50-field memory 19. Since this flip-flop FF is also resettable in response to the vertical sync signal Vs supplied from the second signal processing unit 14, the no signal portion of the image signal input from the magnetic disk apparatus 11 into the second signal processing unit 14 is not A/D-converted during the vertical flyback period.

Figure 3:
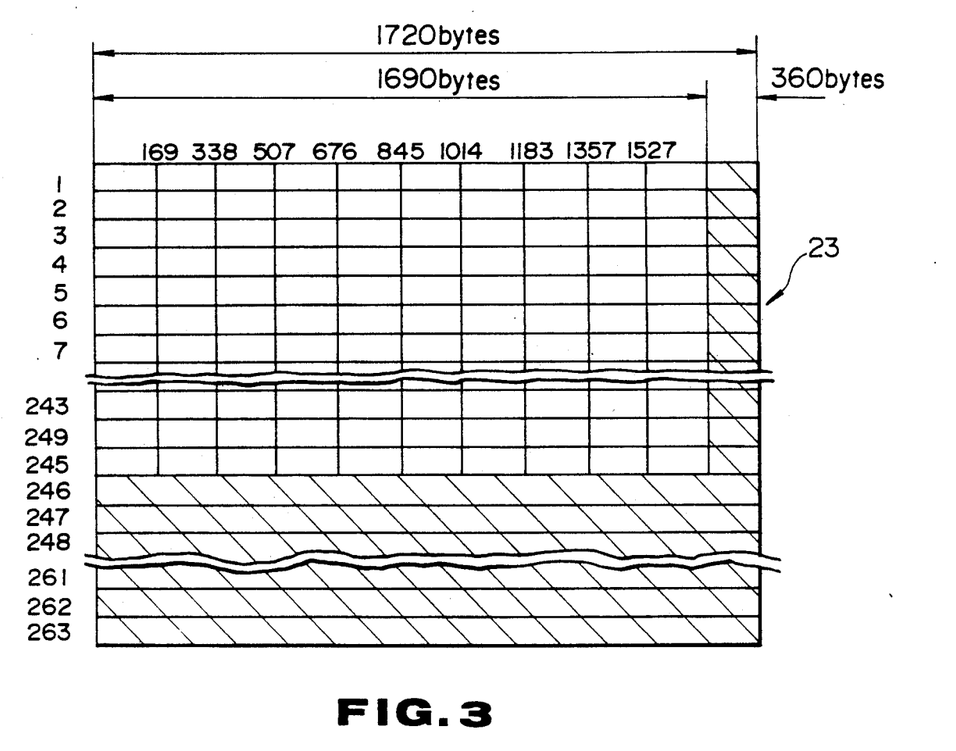
FIG. 3 illustrates a memory arrangement of a 1-field memory shown in FIG. 2.

Thereafter, 1 image data which has been reduced by 1/50 in an area thereof and stored into the above-described 1/50 field memory 19, is transferred into the 1-field memory 23. This 1-field memory 23 has a memory capacity, as illustrated in FIG. 3, corresponding to the 1-screen scanning field containing also both of the horizontal and vertical flyback periods, i.e., 1720 bytes×263 lines=1 effective screen size: (1,690 bytes×245 lines)+(horizontal flyback period: 30 bytes×245 lines)+(vertical flyback period: 1,690 bytes×18 lines). The address instructions of the writing operation "W" and the reading operation "R" for this 1 field memory 23 are executed by the second address control unit 24. As the write address instruction clock for the second address control unit 24, $\phi_B$ is input via an AND gate AND 7 which is controlled by the data transfer control signal output from the control unit 10. Also, as the read address instruction clock, $\phi_A$ is input via an AND gate AND 8 which is under control by the data transfer control signal. Precisely speaking, the second address control unit 24 performs the write address control in synchronism with the clock signal $\phi_B$ which is supplied thereto via the AND gate AND 7 that is controlled by the transfer control signal "C" output from the control unit 10 to the 1-field memory unit 10 to the 1-field memory 23 as the write signal W. Also, this second address control unit 24 executes the write address control in synchronism with the clock signal $\phi_A$ which is furnished thereto via the AND gate AND 8 that is controlled by the transfer control signal "D" output from the control unit 10 to the 1-field memory 23 as the read signal R.

In other words, the 1-field memory 23 stores 50 pieces of the above-described 1/50-reduced image data in the above-described effective screen region (1,690 bytes×245 lines), which are successively transferred from the 1/50-field memory 10. Accordingly, the second address control unit 24 designates line addresses 1 to 49 and column addresses 1 to 169 during the first image data transfer writing operation; then designates line addresses 1 to 49 and column address 170 to 338 during the second image data transfer writing operations; and thereafter designates line addresses 1 to 49 and column addresses 239 to 507 during the third image data transfer writing operation. Therefore, during the tenth image data transfer writing operation, line addresses 1 to 49 and column addresses 1792 to 1960 are designated by the second address control unit 24, and line addresses 50 to 98 and column addresses 1 to 169 are designated during the eleventh image data transfer writing operation.

Figure 4:
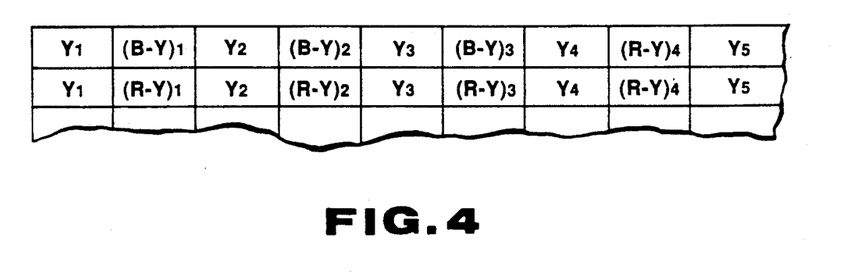
FIG. 4 illustrates a recording condition of a luminance signal and a color difference signal in the 1-field memory shown in FIG. 2.

FIG. 4 illustrates image data storage condition in the above-described field memories 19 and 23. As shown in FIG. 4, both the luminance signal Y and color difference signals C (R-Y, B-Y) which have been sequentially sampled via the above-described A/D converting units 16y and 16c, are alternately arranged in 1 byte unit and stored therein.

Then, the image data which have been formed by condensing 50 pieces of 1/50 reduced image data into a single image, and then stored in the 1-field memory 23, are read out under the second address control unit 24 by the serial address designation of the line addresses 1 to 263 and column addresses 1 to 1,720, and thereafter output in turn into the second digital signal processing unit 25. The function of this second digital signal processing unit 25 is to separate the luminance data "Y" and color difference data "C" (R-Y, B-Y) which are sequentially serial-read out from the 1-field memory 23, and to output these data into the respective D/A converting units 26y and 26c. Both the luminance signal "Y" and color difference signals "C" which are produced by D/A-converting the above-described data in these D/A converting units 26y and 26c, are input via the respective OR gates OR1 and OR2 into the color encoder 15. In this case, during the index mode "I" designation, both the horizontal sync signal "Hs" and vertical sync signal "Vs" are supplied to the color encoder 15 from the sync signal generator 27 which is operated in response to the read address designation clock $\phi_A$ for the 1-field memory 23. As a result, the image signals containing 50 screens, recorded on the floppy disk of the magnetic disk apparatus 11 are output from this color encoder 15 as the NTSC signal. Each of these image signals is reduced by 1/50, and the 1/50-reduced image signals are condensed into 1-screen image signal.

Image Reproduction

A reproduction operation by the still-image information recording/reproducing apparatus with the above-described circuit arrangement will now be described with reference to a flowchart shown in FIG. 5.

Figure 5:
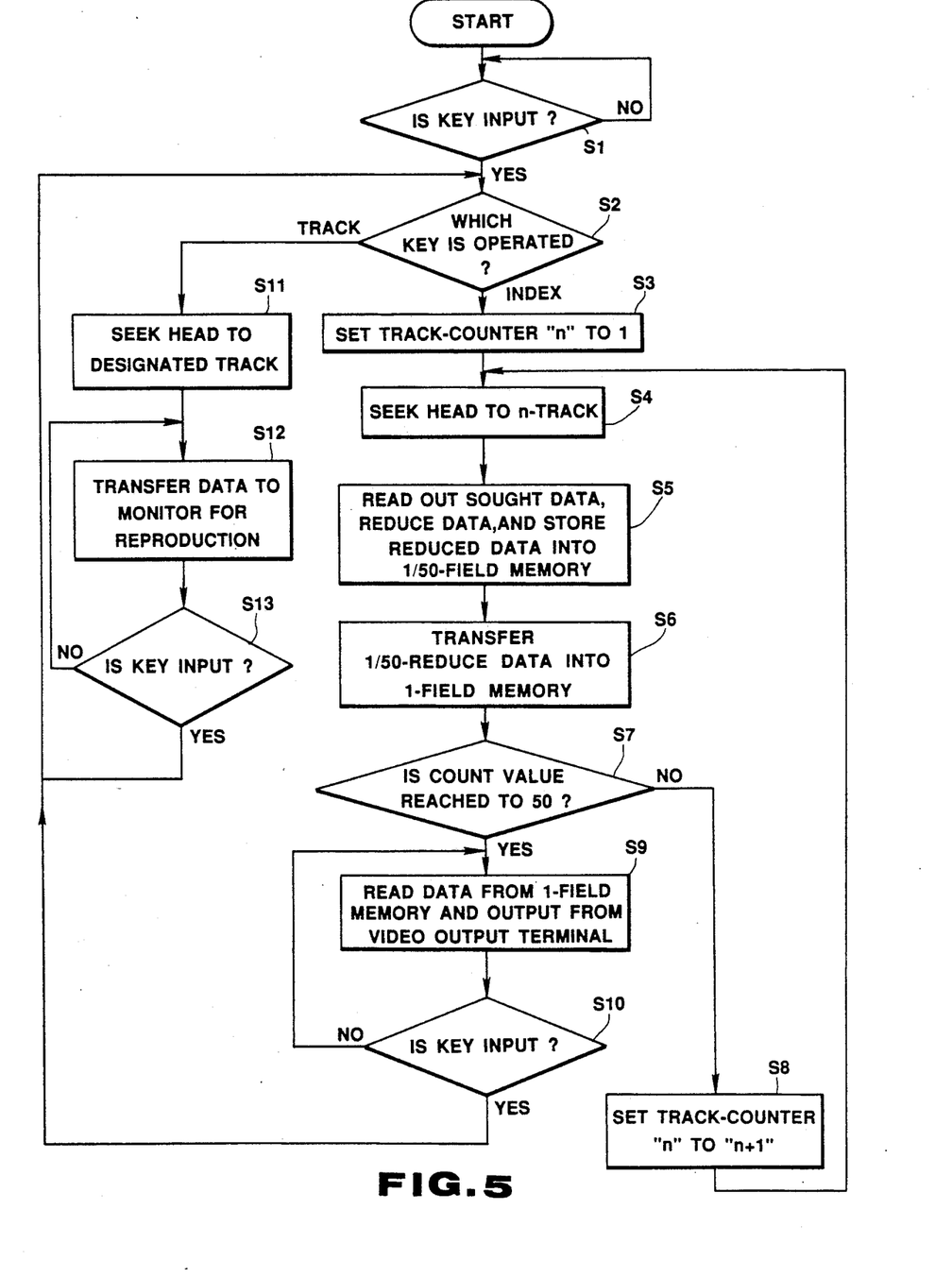
FIG. 5 is a flowchart for explaining the image reproducing process of the still image recording/reproducing apparatus shown in FIG. 1.

In the flowchart shown in FIG. 5, for explaining the image data reproduction, when the recording contents of the 50-screen data recorded on the floppy disk which has been inserted into the disk insertion unit shown in FIG. 1, are required to be checked, the mode switch 3 is set to the "PLAY" mode and then the index key 5 is operated. Then, the operation signal of this index key 5 is output from the key input unit 12 shown in FIG. 2 so that the control unit 10 is set to the index mode "I" (steps S1 and S2).

Thus, when the control unit 10 is set to the index mode "I", the recording track counter "n" for the magnetic disk apparatus 11 is set to "1" and accordingly the magnetic head is sought for the track "1" of the floppy disk (steps S3 and S4). As a consequence, the image data which has been recorded on the track "1" of the floppy disk in the magnetic disk apparatus 11, is successively output to the second signal processing unit 14. The output image data is reduced by 1/50- and A/D-converted, and thereafter written into the 1/50-field memory 19 via the first digital signal processing unit 18 in such a manner that the sampling processes for 1/5 (in the horizontal direction) and 1/10 (in the vertical direction) are performed by the counter 21 and the sampling clock generator 17 (step S5). Under the respective address control units 20 and 24, the 1/50 image data of the track "1" stored into the 1/50-field memory 19 is transferred to a predetermined address within the effective screen region of the 1-field memory 23 (step S6). At this stage, when a judgment is made that the record track counter "n" of the magnetic disk apparatus 11 in the control unit 10 does not yet reach "50", this count data "n" is counted up by +1 and thereafter the above-described series of the image data processing operation is carried out. That is, the recorded data is read out at the previous step S4, 1/50-reduced in the step S5, transferred and stored into the 1-field memory 23 in the step S7 and S8.

Figure 6:
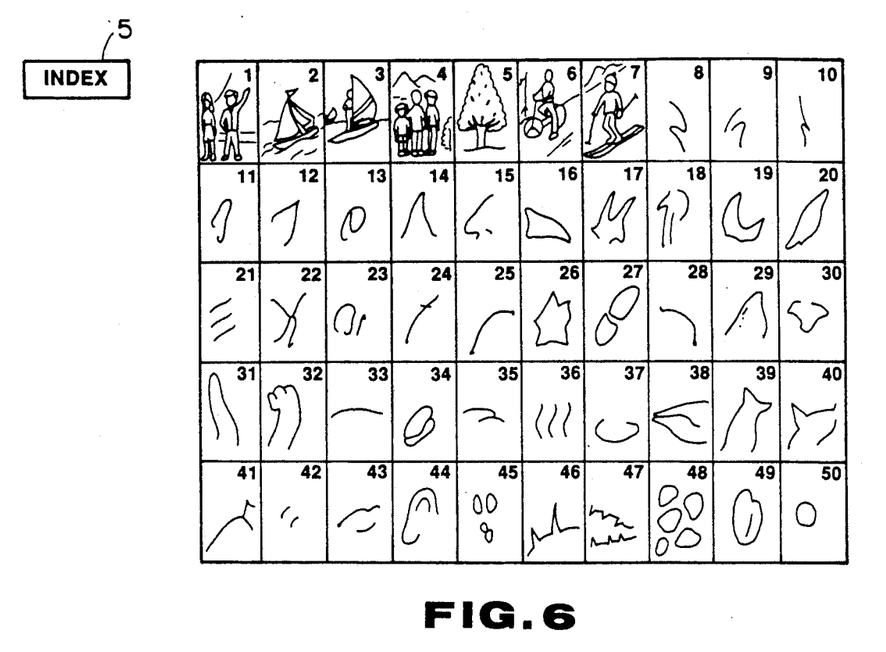
FIG. 6 illustrates various conditions of the reproduced still-images displayed on a TV monitor in an index mode of the still-image recording/reproducing apparatus shown in FIG. 1; and, FIG. 7 illustrates a condition of the reproduced images displayed on the TV monitor in a search mode of the still-image recording/reproducing apparatus shown in FIG. 1.

In other words, by repeating the above-described image data processing operation, the image data which have been recorded on all of the recording tracks 1 to 50 of the floppy disk, are respectively reduced by 1/50, and thus condensed as one field image data, and thus stored into the 1-field memory 23. Thereafter, a judgment is made that the record track counter "n" in the control unit 10 reaches 50, then the process is advanced to a subsequent step S9. In this step S9, in accordance with the read address designation by the second address control unit 24, the condensed image data which has been stored in the previous process are sequentially output to the second digital signal processing unit 25, and furthermore converted by the D/A converters 26y and 26c and color encoder 15 into the corresponding NTSC signal. This NTSC signal is derived from the video output terminal OUT 8b, as illustrated in FIG. 6, into the monitor television for the reproduction purpose (set S9).

When for instance, the image data recorded on the track "2" is selectively searched among 50 pieces of the image data which have been index-reproduced on the above-described monitor television, and then reproduced, the track designation key 7 shown in FIG. 1 is set to "2", "TRACK". Then, the operation signal of the track designation key 7 is output from the key input unit 12, so that the control unit 10 is set to the track "2" search mode S (steps S10 to S2).

Figure 7:
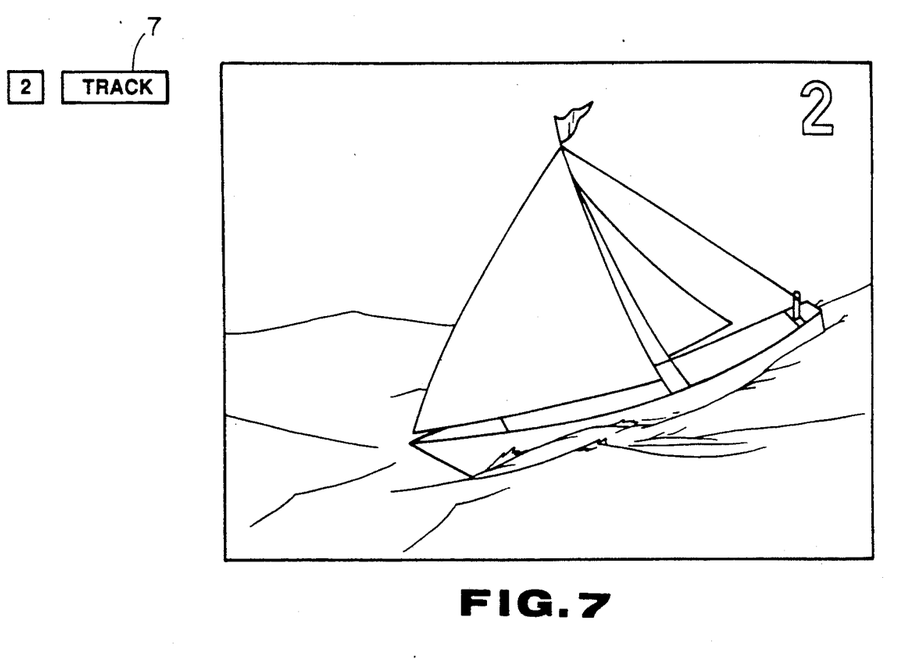

Once the control unit 10 is set to the track "2" search mode S, the record track counter n for the magnetic disk apparatus 11 is set to "2", and then the magnetic head is sougth to the track "2" of the floppy disk (step 11). As a result, the image data which have been recorded on the track "2" of the floppy disk loaded in the magnetic disk apparatus 11, are sequentially output via the second signal processing unit 14 to the color encoder 15, and thus transferred, as the NTSC signals shown in FIG. 7, from the above-described video output terminal OUT 8b to the monitor television where these NTSC signals are reproduced (step S12). As a consequence, only the desired image data among the image data recorded on the floppy disk can be readily selected and reproduced. In this case, until the subsequent key operation signal is newly supplied from the key input unit 12 shown in FIG. 2 into the control unit 10, the image data recorded on the track "2" illustrated in FIG. 7 are continuously reproduced (step S13).

While the invention has been described in detail, according to the still-image information recording/reproducing apparatus, each of the image data which have been recorded on 50 recording tracks of the floppy disk respectively, need not be independently designated by one image data unit for the reproduction purpose. However, all of the image data which have been recorded on 50 tracks of the floppy disk can be readily accessed by processing all image data in the above-described 1/50 image reduction and condensing operation during the index mode. As a consequence, the desired image data can be quickly selected and reproduced.

What is claimed is:

1. An image data recording and reproducing apparatus, which reproduces a desired image out of a plurality of images without using an indexing track, comprising:
   recording means having a plurality of recording areas, for recording a plurality of image data in each of said recording areas;
   image data output means for outputting a plurality of the image data from each of recording areas of said recording means, in sequence;
   reducing means for reducing the image data output from said recording means by said image data output means and for producing reduced data;
   uniting means for uniting a plurality of the reduced data produced by said reducing means and for producing united data comprised of a plurality of reduced data; and
   video signal output means for outputting a video signal according to the united data produced by said uniting means.

2. The apparatus of claim 1, further comprising:
   selecting means for selecting one of a plurality of image data recorded on said recording means; and
   wherein said image data output means includes means for outputting the image data selected by said selecting means from the recording area of said recording means.

3. The apparatus of claim 1, wherein said uniting means includes:
   united data storage means for storing the united data produced by said uniting means;
   locating means for locating a storage area of said united data storage means so as to store each of the reduced data; and
   transfer means for transferring the reduced data to the located storage area of said united data storage means, said located storage area being located by said locating means.

4. The apparatus of claim 3, wherein:
said uniting means further includes reduced data storage means for storing the reduced data produced by said reducing means; and
said transfer means includes means for transferring the reduced data stored in said reduced information storage means to the storage area of said united data storage means, which is located by said locating means.

5. The apparatus of claim 1, wherein:
said recording means comprises a magnetic recording medium; and
said image data output means includes transducing means for producing an analogue signal corresponding to the image data recorded on said magnetic recording medium.

6. The apparatus of claim 5, further comprising:
analogue-to-digital converting means for converting the analogue signal produced by said transducing means into a corresponding digital signal.

7. The apparatus of claim 6, wherein said reducing means includes:
restricting means for restricting an amount of the analogue signal which is converted into the digital signal by said analogue-to-digital converting means.

8. The apparatus of claim 7, wherein the image data recorded on said magnetic recording medium includes a horizontal sync signal; and
said restricting means includes:
counting means for counting the number of the horizontal sync signal including the analogue signal produced by said transducing means;
detecting means for detecting whether or not a value of said counting means is equal to a predetermined number; and
supplying means for supplying the analogue signal to said analogue-to-digital converting means when said detecting means detects that the value of said counting means is equal to a predetermined number.

9. The apparatus of claim 1, wherein said recording medium is a magnetic recording medium.

10. The apparatus of claim 9, wherein said magnetic recording medium is a magnetic disk.

11. A method of reproducing image data recorded on a recording medium, the recording medium having a plurality of recording areas on which are recorded a respective plurality of image data, and for reproducing a desired image out of a plurality of images without using an indexing track, the method comprising the steps of:
outputting a plurality of the image data from each of recording areas of said recording medium in a predetermined sequence;
reducing the image data output from said recording medium and producing reduced data;
uniting a plurality of the reduced data and producing united data comprised of a plurality of reduced data; and
outputting a video signal according to the united data.

12. The method of claim 11, further comprising the steps of:
selecting one image data from said plurality of united data;
outputting the image data selected from the united data output from the recording area of said recording medium; and
outputting a video signal according to the image data output from said recording area of said recording medium.

13. An image data recording and reproducing apparatus, which reproduces a desired image out of a plurality of images without using an indexing track, comprising:
input means for inputting a plurality of image data;
recording means for recording the image data inputted from said input means on a recording medium, said recording medium having a plurality of recording areas for recording thereon a plurality of the image data;
image data output means for outputting a plurality of the image data which was recorded on recording areas of the recording medium by said recording means;
reducing means for reducing the image data output from said recording medium by said image data output means and for producing reduced data;
uniting means for uniting a plurality of the reduced data produced by said reducing means and for producing united data comprised of a plurality of reduced data; and
video signal output means for outputting a video signal according to the united data produced by said uniting means.

14. The apparatus of claim 13, wherein said recording means includes means for recording the image data inputted from said input means as still image data on said recording areas of said recording medium.

15. The apparatus of claim 13, wherein said recording medium is a magnetic recording medium.

16. The apparatus of claim 15, wherein said magnetic recording medium is a magnetic disk.

* * * * *